United States Patent [19]
Roe

[11] Patent Number: 5,182,155
[45] Date of Patent: Jan. 26, 1993

[54] RADOME STRUCTURE PROVIDING HIGH BALLISTIC PROTECTION WITH LOW SIGNAL LOSS

[75] Inventor: Bob J. Roe, Santa Barbara, Calif.

[73] Assignee: ITT Corporation, New York, N.Y.

[21] Appl. No.: 687,038

[22] Filed: Apr. 15, 1991

[51] Int. Cl.⁵ ............................................. B32B 3/12
[52] U.S. Cl. .................................. 428/116; 343/872; 428/911
[58] Field of Search ............... 428/116, 911; 343/872; 156/197

[56] References Cited

U.S. PATENT DOCUMENTS

| | | | |
|---|---|---|---|
| 4,403,012 | 9/1983 | Harpell et al. | 428/290 |
| 4,650,710 | 3/1987 | Harpell et al. | 428/911 X |
| 4,659,598 | 4/1987 | Traut | 428/116 X |
| 4,783,666 | 11/1988 | Ast et al. | 343/872 |
| 4,820,568 | 4/1989 | Harpell et al. | 428/189 X |
| 4,868,040 | 9/1989 | Hallal et al. | 428/251 |
| 4,879,165 | 11/1989 | Smith | 428/212 |
| 4,916,000 | 4/1990 | Li et al. | 428/105 |
| 4,944,974 | 7/1990 | Zachariades | 428/36.1 |
| 4,956,393 | 9/1990 | Boyd et al. | 428/116 X |

OTHER PUBLICATIONS

"In the Air, Land and Sea Radomes' Clear Signals Prevail", *Kaleidoscope*, vol. V, Issue 1, Spring 1990, pp. 1, 4.

*Primary Examiner*—Henry F. Epstein
*Attorney, Agent, or Firm*—Koppel & Jacobs

[57] ABSTRACT

A radome (12) has a composite wall structure including alternating layers of extended chain polyethylene (ECPE) fiber laminate material (26,30) which provides high ballistic protection with low RF signal loss, and fiberglass honeycomb core material (28) which provides high structural rigidity. An electronics assembly (18) and antenna elements (20) are mounted inside the radome (12), with the antenna elements (20) spaced between the electronics assembly (18) and the radome wall structure. A backing plate (24) including a layer of the laminate material (32) and an electrically conductive ground plane (34) are spaced between the electronics assembly (18) and the antenna elements (20). The numbers and thicknesses of the layers of laminate material (26,30) and core material (28) in the wall structure are selected such that the combined thickness of the layers of laminate material (26,30) has a maximum value at which the RF signal loss through the wall structure at a predetermined frequency is below an acceptable value. The backing plate (24) provides even greater ballistic protection for the electronics assembly (18).

10 Claims, 2 Drawing Sheets

RADOME STRUCTURE PROVIDING HIGH BALLISTIC PROTECTION WITH LOW SIGNAL LOSS

BACKGROUND OF THE INVENTION

1. Field of the Invention

The present invention relates to a radar dome (radome) structure which provides a high level of ballistic protection for an electronics assembly and antenna elements mounted therein, together with high transparency to electromagnetic signals propagating therethrough.

2. Description of the Prior Art

It is desirable to mount a radar antenna and associated electronic units (transmitting, receiving, signal processing circuitry, etc.) inside a radome structure to protect these elements from weather and ballistic projectiles without adversely affecting the electrical performance of the radar system.

Radomes for ballistic protection of land and ship based radar antennas have conventionally utilized fiberglass and/or aramid materials in single layer or composite wall structures. The composite or sandwich wall construction is desirable for increasing the structural rigidity of the radome so that it can withstand high wind loading, typically in excess of 100 km/hr, without excessive deflection. A typical configuration is described in U.S. Pat. No. 4,783,666, entitled "PROTECTIVE SHIELD FOR AN ANTENNA ARRAY", issued Nov. 8, 1988, to H. Ast et al. The materials used must be as transparent as possible at the radio frequencies (RF) utilized by the radar to minimize the energy loss of the RF signals propagating through the radome.

In complex radar antennas this loss is very critical to the operation of the system and must be minimized. The allowable RF energy loss through the radome wall limits the maximum thickness of the radome which in turn establishes the maximum ballistic protection. To achieve the highest possible level of ballistic protection, the radome material must have a high ballistic limit, low RF signal loss, and ideally will also have low weight density. Fiberglass and aramid materials provide acceptable levels of ballistic protection and have low weight density, but the RF signal loss is relatively high which, in many cases, degrades the performance of the antenna below acceptable limits.

A high ballistic strength material has recently been developed and marketed under the trademark SPECTRA ® by Allied Fibers, a division of Allied Signal, Inc. The SPECTRA ® material is formed of extended chain polyethylene (ECPE) fibers, and provides higher ballistic protection and lower signal loss than conventional fiberglass and aramid materials. Examples of laminates formed from ECPE fibers are disclosed in U.S. Pat. No. 4,820,568, entitled "COMPOSITE AND ARTICLE USING SHORT LENGTH FIBERS", issued Apr. 11, 1989, to G. Harpell et al, and assigned to Allied Signal, Inc.

A composite radome wall structure utilizing ECPE laminates is capable of providing sufficient ballistic protection for many applications while maintaining the two-way RF insertion loss over a range of operating frequencies and scan angles below a low value on the order of 0.13 dB. However, where ballistic protection against heavy projectiles such as .50 caliber bullets is required, increasing the total thickness of the ECPE laminate in the radome wall structure to a sufficient value to stop the projectiles increases the RF insertion loss to an unacceptably high level.

SUMMARY OF THE INVENTION

Phased array and other types of radar systems typically include antennas consisting of a large number of elements which are mounted between the electronic units and the radome wall. The radar system may continue to function and provide usable target information even if some of the antenna elements are rendered inoperative by projectiles or fragments which penetrate the radome wall. The antenna elements are also relatively inexpensive. However, the electronic units including the transmit, receive, signal processing, power supply, and other circuitry which are mounted behind the antenna elements are much more critical and expensive. A single hit to an electronic unit could not only destroy the unit itself, but render the entire radar system inoperative.

The present invention overcomes the drawbacks of the prior art by providing a radome structure which offers a relatively high level of ballistic protection for both the antenna elements and electronic units housed in the radome, and an even higher level of ballistic protection for the critical electronic units. This is accomplished without increasing the RF signal loss through the radome wall structure to an unacceptable value.

More specifically, the present ballistic protection structure includes a radome having a composite wall structure including alternating layers of ECPE laminate material which provides high ballistic protection with low RF signal loss, and fiberglass honeycomb core material which provides high structural rigidity. An electronics assembly and antenna elements are mounted inside the radome, with the antenna elements spaced between the electronics assembly and the wall structure. A backing plate including a layer of the laminate material and an electrically conductive ground plane are spaced between the electronics assembly and the antenna elements. The numbers and thicknesses of the layers of laminate material and core material in the wall structure are selected such that the combined thickness of the layers of laminate material has a maximum value at which the RF signal loss through the wall structure at a predetermined frequency is below an acceptable value. The backing plate provides even greater ballistic protection for the electronics assembly.

DETAILED DESCRIPTION OF PREFERRED EMBODIMENT

Figure 1:
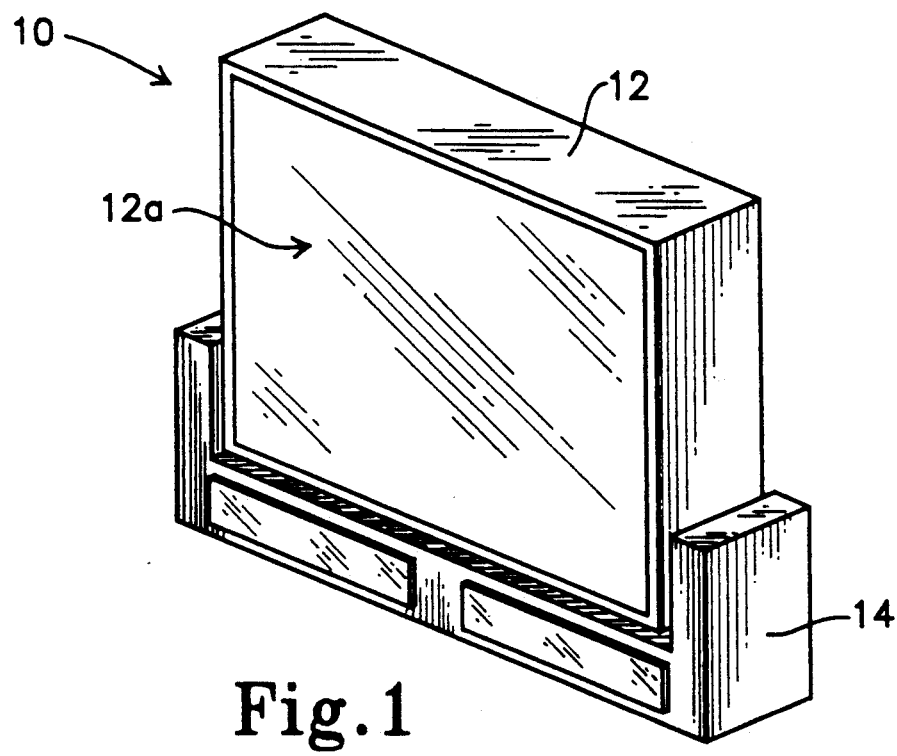
FIG. 1 is a perspective view illustrating a radome structure embodying the present invention.
Figure 2:
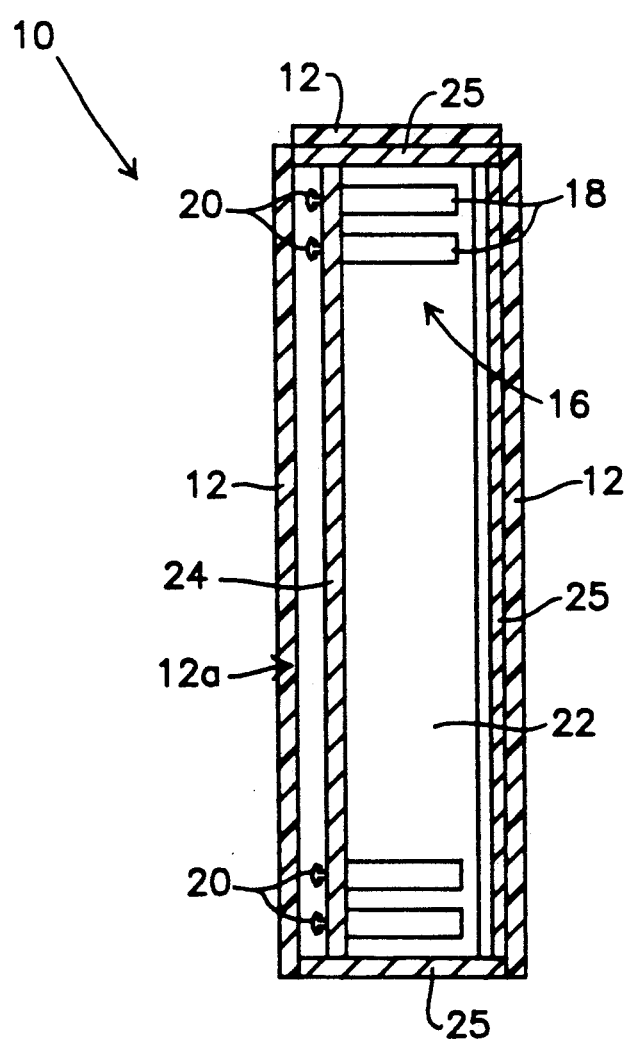
FIG. 2 is a simplified sectional elevation illustrating the present radome structure and an active aperture radar antenna mounted therein.
Figure 3:
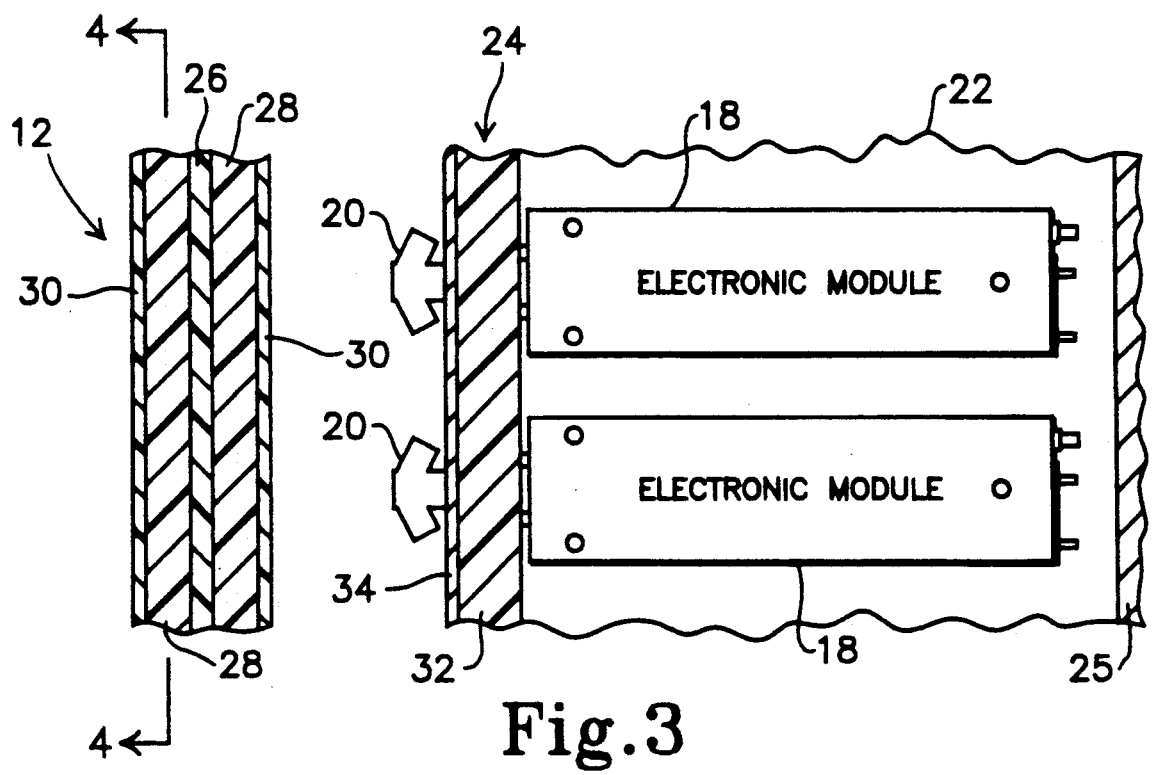
FIG. 3 is a fragmentary sectional view of the present radome structure illustrating the wall construction thereof to enlarged scale.

Referring now to FIGS. 1 to 3 of the drawing, a ballistic protection structure embodying the present invention is generally designated as 10, and includes a radome 12 having a composite wall structure. Although the radome 12 is illustrated as having a generally rectangular shape, the invention is not so limited, and the radome 12 may have any shape suitable for a particular application consisting of curved and/or flat wall sections.

The radome 12 is supported by a yoke 14, which may be mounted on a ground pad, tower, ship, aircraft, etc. A radar assembly 16 is mounted inside the radome 12, and includes a plurality of electronic units 18 and antenna elements 20 supported on a frame 22. The antenna elements 20 may be transmit and/or receive elements, and are functionally connected to the electronic units 18, which may include transmit, receive, signal processing, and/or power supply circuitry. The radar assembly 16 may be of any appropriate type, such as active aperture, phased array, Doppler, etc.

In accordance with the present invention, a backing plate 24 is mounted on the frame 22 inside the radome 12 between the electronic units 18 and antenna elements 20. The backing plate 24 may extend entirely around the electronic units 18, or only between the antenna elements 20 and the units 18. An inner shell of armor plating 25 made of steel or the like may be provided inside the radome 12 except inside a wall 12a thereof which faces the antenna elements 20. The antenna elements 20 transmit and/or receive electromagnetic signals through the wall 12a, and the armor plating 25 would attenuate the signals if provided in front of the antenna elements 20.

It will be noted that only the wall 12a of the radome 12 is critical for transmission of electromagnetic signals. The other walls of the radome 12 are only required to provide ballistic protection. Thus, any or all walls of the radome 12 except for the wall 12a may be replaced by an alternative protective structure. Said structure may be constituted by the armor plating 25 alone. Alternatively, the armor plating 25 may be omitted and the ballistic protection provided by the radome 12 alone comprising all of the walls as illustrated.

The detailed construction of the wall structure of the radome 12 and backing plate 24 is illustrated in FIG. 3. The wall structure of the radome 12 includes alternating layers of ECPE laminate material, and honeycomb core material. More specifically, the radome 12 includes a center layer 26 of the laminate material, core layers 28 of the core material adhered to the opposite surfaces of the center layer 26, and outer layers or skins 30 of the laminate material adhered to the outer surfaces of the core layers 28.

The laminate layers 26 and 30 are preferably formed of SPECTRA SHIELD ®, an ECPE material manufactured by Allied Fibers, although other ECPE materials such as SPECTRA 1000 ®, also manufactured by Allied Fibers, may be used. The core layers 28 are formed of a material such as fiberglass or nylon which is processed into an open honeycomb core shape. The laminate material is selected to have a higher dielectric constant than the core material, with the loss tangents of both materials being as low as possible. The loss tangent of the core material will typically be higher than that of the laminate material. However, the overall dielectric constant of the core layers 28 will be acceptably low due to the open honeycomb core configuration thereof.

The radome 12 is designed to provide the highest possible level of ballistic protection for the electronic units 18 and antenna elements 20 mounted therein, without increasing the RF insertion loss through the radome wall structure to an unacceptably high level. Although the detailed design of the wall structure of the radome 12 involves the interaction and tradeoff between many variables, the primary design criteria is to make the total or combined thickness of the laminate layers 26 and 30, which provide the ballistic protection, as large as possible without exceeding the maximum RF insertion loss limit.

The thicknesses of the layers 26, 28 and 30 are best calculated as functions of the operating frequency range of the radar assembly 16, the angular scan or incidence range of the antenna elements 20, and the maximum acceptable RF insertion loss using computer optimization as described in the above referenced patent to Ast et al, due to the large number of variables and interaction involved. The basic mathematical relations for performing the requisite calculations are well known in the art per se, such as described in chapter 2 of a textbook entitled "FOUNDATIONS FOR MICROWAVE ENGINEERING", by R. Colin, Mc-Graw Hill, New York, 1966.

Generally, the thicknesses of the core layers 28 will be made approximately equal to ¼ wavelength at the center operating frequency of the radar assembly 16 in order to minimize reflection losses. However, considerable deviation from this value may be required if scan angles which differ substantially from normal incidence, and/or a relatively large operating frequency range will be encountered. The center layer 26 is preferably on the order of, but need not be exactly, twice as thick as the outer layers 30. The design must be optimized for each particular application depending on the individual parameters involved.

In a preferred embodiment of the invention, the laminate layers 26 and 30 are formed of SPECTRA SHIELD ® which has a dielectric constant of approximately 2.5 and a loss tangent of approximately 0.002. It is desirable, although not absolutely necessary depending on the particular application, that the material used for the layers 26 and 30 have a dielectric constant and loss tangent which do not substantially exceed these respective values. The core layers 28 are preferably formed of a fiberglass fabric honeycomb material manufactured by the Hexel Corp. of Dublin, Calif., under product designation HEXEL ® HRP-⅜-3.2.

In the preferred embodiment, the center layer 26 is approximately 1.04 cm thick, the core layers 28 are approximately 0.63 cm thick, and the outer layers 30 are approximately 0.30 cm thick. The total thickness of the wall structure 12 is approximately 2.92 cm, with the combined thickness of the laminate layers 26 and 20 being approximately 1.65 cm. The two-way RF insertion loss of the radome 12 for a center frequency of 5.5 GHz is less than approximately 0.13 dB, over a frequency range of ±9% and an angular range of ±45 degrees. The radome 12 provides ballistic protection for the antenna elements 20 against standard fragment simulating projectiles as tabulated in TABLE 1, tested in accordance with the military standard for armor, MIL-STD-662C.

TABLE 1

| BALLISTIC THREAT | BALLISTIC LIMIT (V50) |
| --- | --- |
| .22 cal (17 grains) | 1249 m/sec |
| .30 cal (44 grains) | 796 m/sec |
| .50 cal (207 grains) | 553 m/sec |

The backing plate 24 preferably includes a 1.27 cm thick inner plate or layer 32 of SPECTRA SHIELD ®, and a 0.10 cm thick aluminum layer 34 adhered to the surface of the layer 32 which faces away from the electronic units 18. The layer 34 is electrically conductive, and provides a ground plane for the antenna elements 20. The bases of the antenna elements 20 extend through openings (not shown) in the backing plate 24, and are operatively connected to the electronic units 18. The provision of the backing plate 24 increases the level of ballistic protection for the electronic units 18 as tabulated in TABLE 2.

TABLE 2

| BALLISTIC THREAT | BALLISTIC LIMIT (V50) |
| --- | --- |
| .22 cal (17 grains) | 1829 m/sec |
| .30 cal (44 grains) | 1341 m/sec |
| .50 cal (207 grains) | 853 m/sec |

The backing plate 24 provided in accordance with the present invention increases the ballistic protection for the critical electronic units 18 to a level sufficient to resist heavy projectiles on the order of .50 caliber, while enabling the radome 12 to have sufficient RF transparency to avoid detrimental effects on the operation of the radar assembly 16. Although the ballistic protection for the antenna elements 20 is limited to smaller caliber projectiles, the protection provided by the radome 12 alone is sufficient for many applications since the radar assembly 16 can continue to function even if some of the antenna elements 20 are damaged. The thickness of the laminate layer 32 of the backing plate 24 is selected to increase the ballistic limit provided by the ballistic protection structure 10 including the radome 12 and backing plate 24 in combination to the value required for protection of the electronic units 18.

Figure 4:
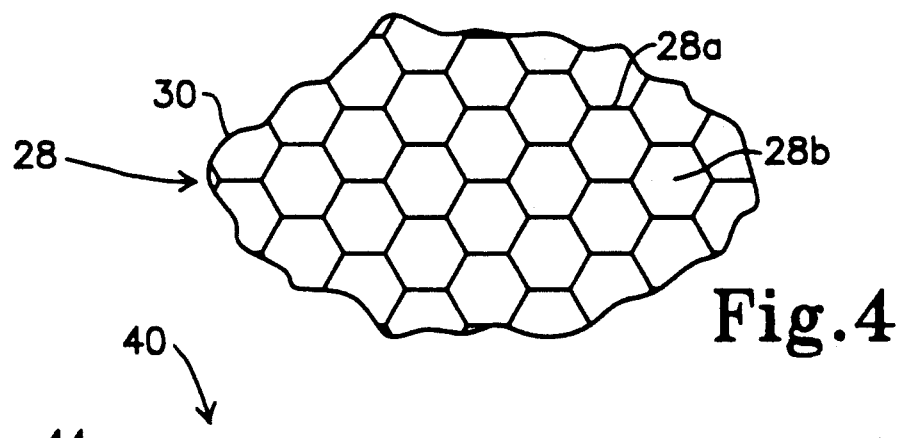
FIG. 4 is a section taken on a line 4—4 of FIG. 3.

A cross-sectional view of the core layers 28 is presented in FIG. 4. The structure of the layers 28 includes fiberglass walls 28a which extend perpendicular to the laminate layers 26 and 30 and define open cells 28b therebetween. The cells 28b are illustrated as having a hexagonal shape, but may have any other suitable shape within the scope of the invention.

Figure 5:
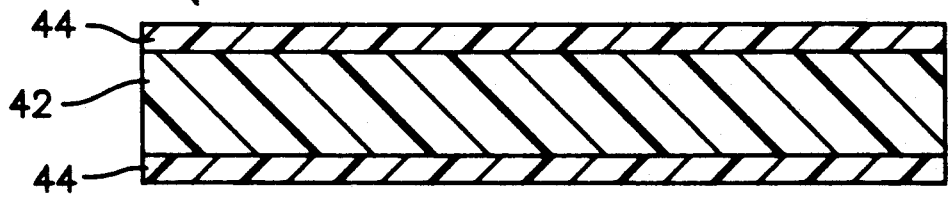
FIGS. 5 and 6 are sectional views illustrating alternative wall constructions of the present radome structure.
Figure 6:
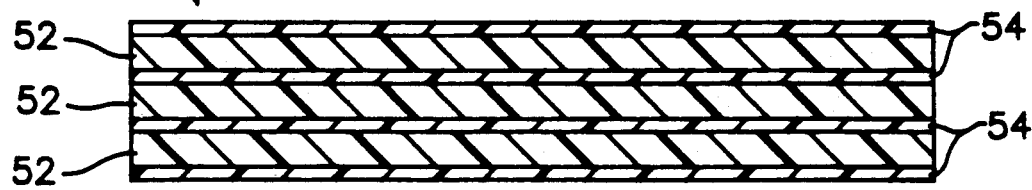

Although the present radome 12 has been described and illustrated as consisting of five material layers, the invention is not so limited, and the numbers and thicknesses of the layers may be selected differently in accordance with a particular application. As illustrated in FIG. 5, a modified radome wall structure 40 includes a single honeycomb core layer 42, and relatively thick outer laminate layers 44 formed of ECPE material. As illustrated in FIG. 6, another modified radome wall structure 50 includes three honeycomb core layers 52, and four relatively thin laminate layers 54 formed of ECPE material. It will be understood, however, that if the laminate layers are made too thin, they will not be able to provide effective ballistic protection.

The ballistic protection provided by the present invention was tested, and the effectiveness thereof demonstrated as summarized in the following examples.

EXAMPLE 1

30.5 cm square test panels were fabricated having a composite wall structure including alternating layers of SPECTRA SHIELD ® and Hexel HRP-⅜-3.2 as described above with reference to FIGS. 1 to 4. The outer laminate layers 30 were each formed of 21 plies of SPECTRA SHIELD. The center layer 26 was formed of 70 plies of SPECTRA SHIELD ®. The fibers in each laminate layer extended at a 90 degree angle to the fibers in adjacent laminate layers. The laminate layers 26 and 30 were individually pressed at 110° C. to compress them to the desired thicknesses. The laminate layers 26 and 30 were bonded to the core layers 28 using Polaroid XPE-10 urethane adhesive in a polyester veil carrier.

The weight density of the panels was 17.11 kg/m$^2$, and the ballistic results were as tabulated in TABLE 1 above.

EXAMPLE 2

30.5 cm square test panels consisting of a center laminate layer, two core layers, and two outer laminate layers were fabricated using a procedure similar to EXAMPLE 1. However, the laminate layers were formed of a less preferred ECPE material, SPECTRA 1000 ®. The outer laminate layers were 0.25 cm thick and consisted of 16 plies, whereas the central layer was 0.51 cm thick and consisted of 32 plies. The core layers were 0.95 cm thick. The total thickness of the panels was 2.92 cm, the same as in EXAMPLE 1, whereas the combined thicknesses of the laminate layers was 1.02 cm. The weight density of the SPECTRA 1000 ® panels was 12.22 kg/m$^2$, considerably less than that of the SPECTRA SHIELD ® panels, with the two-way insertion loss over frequency range and scan angle having the same maximum value of 0.13 dB. However, the ballistic protection of the panels in EXAMPLE 2 was considerably less than that in EXAMPLE 1, as tabulated in TABLE 3.

TABLE 3

| BALLISTIC THREAT | BALLISTIC LIMIT (V50) |
| --- | --- |
| .22 cal (17 grains) | 543 m/sec |
| .30 cal (44 grains) | 410 m/sec |
| .50 cal (207 grains) | 300 m/sec |

It will be seen that the SPECTRA SHIELD ® material provides higher ballistic protection with lower RF loss than the SPECTRA 1000 ® material. Thus, the combined thickness of the laminate layers in a SPECTRA SHIELD ® structure may be greater than in a SPECTRA 1000 ® structure for the same value of RF loss, thereby providing increased ballistic protection. The present backing plate 24 is especially desirable in a radome including a wall structure fabricated using a laminate material which does not have the superior qualities of SPECTRA SHIELD ®.

Since the principles of the invention have now been made clear, modifications which are particularly adapted for specific situations without departing from these principles will be apparent to those skilled in the art. The appended claims are intended to cover such modifications as well as the subject matter described and to only be limited by the true spirit and scope of the invention.

What is claimed as new and desired to be secured by Letters Patent of the United States is:

I claim:

1. A ballistic protection structure for a radar system including an electronic unit and an antenna element, comprising:
   a radome including a composite wall structure having alternating layers of extended chain polyethylene fiber laminate material and honeycomb core material, the electronic unit and antenna element being disposed inside the radome such that the antenna element is spaced between the electronic unit and the wall structure; and a backing plate disposed inside the radome between the electronic unit and the antenna element, the backing plate in combination with the wall structure providing a predetermined limit value of ballistic protection for the electronic unit.

2. A ballistic protection structure as in claim 1, in which:

said laminate material has a dielectric constant which is higher than a dielectric constant of said core material; and numbers and thicknesses of the layers of said laminate material and said core material are selected such that a combined thickness of the layers of said laminate material has a maximum value at which the electromagnetic signal loss through the wall structure at a predetermined frequency is below a predetermined value.

3. A ballistic protection structure as in claim 2, in which said laminate material is selected such that the dielectric constant thereof is no greater than approximately 2.5 and the loss tangent thereof is no greater than approximately 0.002.

4. A ballistic protection structure as in claim 2, in which said core material comprises fiberglass.

5. A ballistic protection structure as in claim 2, in which the wall structure comprises:

a center layer of said laminate material;

first and second core layers of said core material adhered to opposite surfaces of the center layer respectively; and first and second outer layers of said laminate material adhered to outer surfaces of the first and second core layers respectively.

6. A ballistic protection structure as in claim 5, in which the first and second core layers each have a thickness which is equal to approximately ¼ wavelength at said predetermined frequency.

7. A ballistic protection structure as in claim 5, in which said thickness of the center layer is approximately twice said thickness of each of the first and second outer layers.

8. A ballistic protection structure as in claim 5, in which said thickness of the center layer is approximately 1.04 cm, said thickness of the core layers is approximately 0.63 cm, and said thickness of the outer layers is approximately 0.30 cm.

9. A ballistic protection structure as in claim 1, in which the backing plate comprises:

a ballistic protection layer of said laminate material; and a ground plane layer formed of an electrically conductive material adhered to a surface of the ballistic protection layer which faces away from the electronic unit.

10. A ballistic protection structure as in claim 9, in which:

the ballistic protection layer is approximately 1.27 cm thick; and the ground plane layer comprises aluminum and is approximately 0.10 cm thick.

* * * * *